(12) United States Patent
Miyasaka et al.

(10) Patent No.: US 8,727,588 B2
(45) Date of Patent: May 20, 2014

(54) CONSTRUCTION MACHINE

(75) Inventors: Hisashi Miyasaka, Komatsu (JP);
Kazuyuki Sagara, Komatsu (JP);
Shuichi Osawa, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/807,164

(22) PCT Filed: Jul. 23, 2012

(86) PCT No.: PCT/JP2012/068569
§ 371 (c)(1),
(2), (4) Date: Dec. 27, 2012

(87) PCT Pub. No.: WO2013/031427
PCT Pub. Date: Mar. 7, 2013

(65) Prior Publication Data
US 2014/0078761 A1     Mar. 20, 2014

(30) Foreign Application Priority Data

Aug. 31, 2011   (JP) .................................. 2011-188834

(51) Int. Cl.
*B60Q 1/00*          (2006.01)
(52) U.S. Cl.
CPC ....................... *B60Q 1/00* (2013.01)
USPC ............................ 362/485; 362/546; 362/362
(58) Field of Classification Search
CPC .................... B60Y 2200/41; B60Y 2200/415; B60Q 1/00; B60Q 1/24
USPC ............. 362/362, 485, 546, 549; 37/411, 442
See application file for complete search history.

(56) References Cited

U.S. PATENT DOCUMENTS

| 6,152,586 A | 11/2000 | Dealey, Jr. et al. |
| 2005/0270778 A1* | 12/2005 | Hicok et al. .................. 362/253 |
| 2009/0196057 A1* | 8/2009 | Case et al. ..................... 362/487 |
| 2009/0244920 A1 | 10/2009 | Yomogita et al. |

FOREIGN PATENT DOCUMENTS

| CN | 101375003 A | 2/2009 |
| JP | 56-9606 | 1/1981 |
| JP | 63-207750 | 8/1988 |
| JP | 2000-177479 A | 6/2000 |
| JP | 2000-296727 | 10/2000 |
| JP | 2004-114850 | 4/2004 |
| JP | 2004-143853 | 5/2004 |
| JP | 2008-95339 | 4/2008 |
| WO | WO 2007/099720 A1 | 9/2007 |

* cited by examiner

*Primary Examiner* — David V Bruce
(74) *Attorney, Agent, or Firm* — Drinker Biddle & Reath LLP

(57) ABSTRACT

A wheel loader, which is a construction machine, includes: a rear vehicle body and a front frame; an operating device provided at the front frame; and a working lamp unit attached to a sidewall of the rear vehicle body. The working lamp unit has a light source and a bracket including a downward illuminating portion that covers at least an upper part of the light source and that protrudes more in the light illumination direction than a lens surface of the light source and that is inclined downward with respect to a horizontal direction. Thus, there is obtained a construction machine including a working lamp, in which visibility can be ensured both in a distant area and in an area near the construction machine.

6 Claims, 4 Drawing Sheets

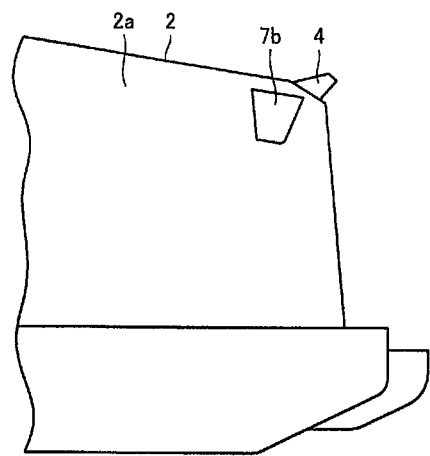
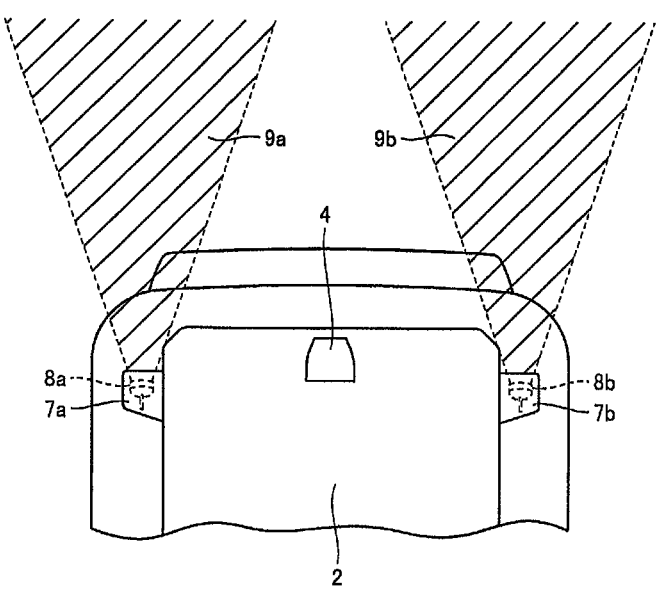

CONSTRUCTION MACHINE

TECHNICAL FIELD

The present invention relates to a construction machine, and particularly to a construction machine including a working lamp.

BACKGROUND ART

Construction machines are machines used for civil engineering and building operations (works) and include various machines such as a bulldozer, a motor grader, a wheel loader, and a hydraulic excavator. Some of these construction machines include a working lamp for allowing operations during the night, in a dark place and the like, for example.

For example, Japanese Patent Laying-Open No. 2000-296727 describes a wheel loader including a head lamp. Japanese Patent Laying-Open No. 2004-143853 describes a hydraulic excavator including a working lamp, and Japanese Patent Laying-Open No. 2008-95339 describes a hydraulic excavator including a head lamp.

CITATION LIST

Patent Literature

PTL 1: Japanese Patent Laying-Open No. 2000-296727
PTL 2: Japanese Patent Laying-Open No. 2004-143853
PTL 3: Japanese Patent Laying-Open No. 2008-95339

SUMMARY OF INVENTION

Technical Problem

The working lamps described in the aforementioned literatures are all of such a type that they directly emit spot light. Therefore, it is difficult to ensure visibility both in a distant area and in an area near the construction machine.

For example, in order to brightly illuminate the distant area, the intensity of light emitted from the working lamp may only be increased. In the case of spot illumination, however, the contrast between the illuminated area and its surrounding area is high. Therefore, the area near the construction machine appears to be dark, which leads to decrease in visibility in the area near the construction machine. Particularly in an area around a lower part of the construction machine, visibility decreases extremely.

Thus, it is conceivable to provide both a working lamp for illuminating the distant area and a working lamp for illuminating the area around the lower part of the construction machine. In this case, however, the number of the working lamps increases, which leads to complication of the structure.

The present invention has been made in light of the problems described above. An object of the present invention is to provide a construction machine including a working lamp, in which visibility can be ensured both in a distant area and in an area near the construction machine.

Solution to Problem

A construction machine according to the present invention includes: a construction machine main body; an operating device provided at the construction machine main body; and a working lamp unit attached to a sidewall of the construction machine main body. The working lamp unit has a light source and a bracket including a downward illuminating portion that covers at least an upper part of the light source and that protrudes more in light illumination direction than a lens surface of the light source and that is inclined downward with respect to a horizontal direction.

Preferably, the bracket has a front surface portion surrounding the light source. "Front surface portion" herein refers to a surface directed to the light illumination direction. For example, when the working lamp unit is attached as a head lamp to the front side of the construction machine main body, a surface located on the front side corresponds to "front surface portion". When the working lamp unit is for illuminating a rear part, a surface located on the rear side corresponds to "front surface portion". Preferably, the light source is arranged such that at least a part of the lens surface of the light source protrudes in the light illumination direction from the front surface portion. In addition, preferably, an optical axis of the light source is directed downward with respect to the horizontal direction.

Preferably, an inclination angle of the optical axis of the light source with respect to the horizontal direction is set to be 5° to 15°. In addition, a portion of the front surface portion located below the lens surface of the light source may be provided with an inclined portion that is inclined with respect to a vertical direction toward a direction retracted with respect to the light illumination direction.

The working lamp unit can be arranged at a position displaced rearward from a front side end of the construction machine main body or at a position displaced frontward from a rear side end of the construction machine main body. In addition, the inclination angle of the optical axis of the light source with respect to the horizontal direction may be set to be larger than an inclination angle of the downward illuminating portion with respect to the horizontal direction. Preferably, the bracket includes, around the front surface portion, at least one sidewall portion protruding more in the light illumination direction than the front surface portion.

Advantageous Effects of Invention

In the construction machine according to the present invention, the bracket of the working lamp unit includes the downward illuminating portion. Therefore, the area around the lower part of the construction machine can be illuminated with light and visibility can be ensured both in the distant area and in the area near the construction machine.

BRIEF DESCRIPTION OF DRAWINGS

FIG. 3 is an enlarged side view of a working lamp unit and a portion near the working lamp unit in the wheel loader shown in FIGS. 1 and 2.
FIG. 4 is an enlarged plan view of the working lamp unit and the portion near the working lamp unit in the wheel loader shown in FIGS. 1 and 2.

DESCRIPTION OF EMBODIMENTS

Embodiments of the present invention will be described hereinafter with reference to FIGS. 1 to 8. An embodiment in which the idea of the present invention is applied to a wheel loader that is one example of a construction machine will be first described with reference to FIGS. 1 to 6.

Figure 1:
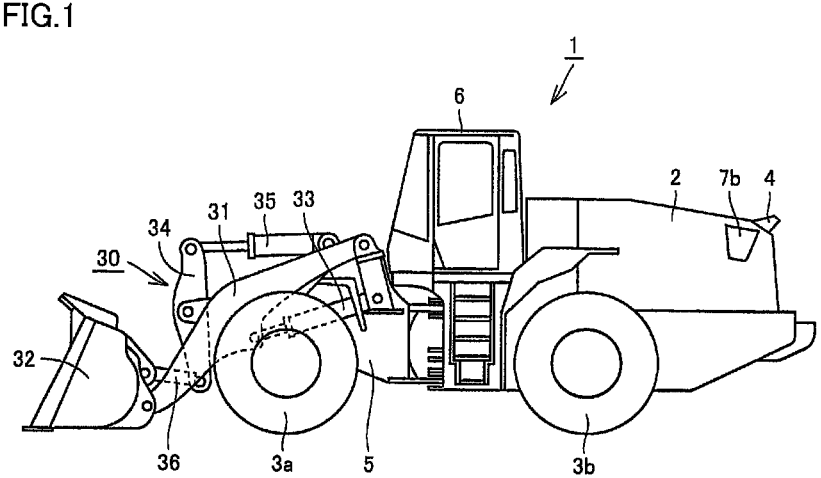
FIG. 1 is a side view of a wheel loader according to one embodiment of the present invention.
Figure 2:
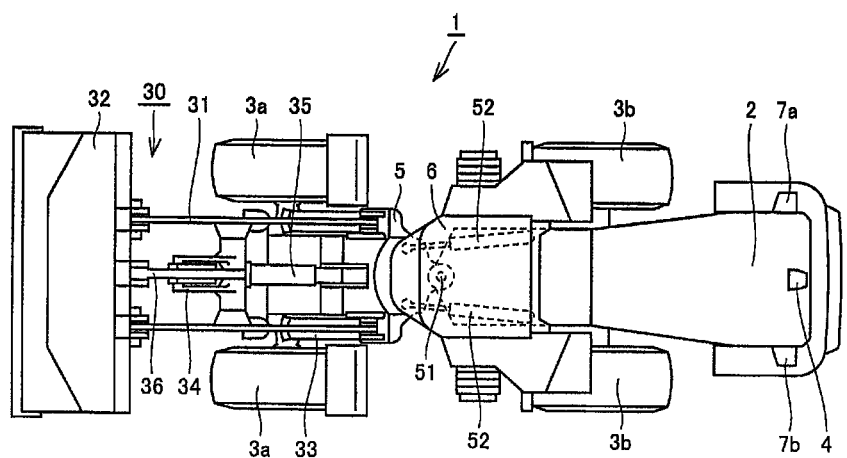
FIG. 2 is a plan view of the wheel loader shown in FIG. 1.

An overall configuration of a wheel loader 1 according to the present embodiment will now be described with reference to FIGS. 1 and 2. As shown in FIGS. 1 and 2, wheel loader 1 includes a rear vehicle body 2, a front frame 5 and an operating device 30. Front wheels 3a are attached to the respective sides of front frame 5, and rear wheels 3b are attached to the respective sides of rear vehicle body 2.

Rear vehicle body 2 and front frame 5 are connected by a center pin 51 so as to freely swing to the right and left, and constitute an articulated structure. Rear vehicle body 2 and front frame 5 are linked by one pair of right and left steering cylinders 52. These rear vehicle body 2 and front frame 5 mainly constitute a vehicle body (construction machine main body) of wheel loader 1.

Operating device 30 is attached to a front part of front frame 5. Operating device 30 has a boom 31 having a base end swingably attached to front frame 5, and a bucket 32 swingably attached to a tip of boom 31. Front frame 5 and boom 31 are linked by one pair of boom cylinders 33.

Operating device 30 also has a tilt arm 34 swingably supported by boom 31 at a substantially central portion thereof, a bucket cylinder 35 linking a base end of tilt arm 34 and front frame 5, and a tilt rod 36 linking a tip of tilt arm 34 and bucket 32. An engine room is arranged at a rear part of rear vehicle body 2. In addition, an operating room 6 is attached to an upper front part of rear vehicle body 2.

As shown in FIGS. 1 and 2, in wheel loader 1 according to the present embodiment, working lamp units 7a and 7b are placed on the respective sidewalls of rear vehicle body 2. A camera unit 4 is also placed on an upper surface of rear vehicle body 2.

The working lamp unit is for illuminating an area around wheel loader 1 including an operation area. In the present embodiment, working lamp units 7a and 7b have a function of illuminating a rear area of wheel loader 1. Although two working lamp units 7a and 7b are provided in the present embodiment, the number of the working lamp units can be set arbitrarily.

Camera unit 4 is located between working lamp units 7a and 7b, and is placed at a central portion in the width direction on the upper surface of rear vehicle body 2 and at a rear side end of rear vehicle body 2. Using this camera unit 4, a picture of the rear area of wheel loader 1 can be taken, and a state of the rear area of wheel loader 1 can be checked through a monitor and the like.

As shown in FIG. 3, in the present embodiment, working lamp unit 7b is arranged on a sidewall 2a located near the upper surface of rear vehicle body 2 and at a position displaced frontward from the rear side end of rear vehicle body 2. As for the relationship with camera unit 4, working lamp unit 7b is arranged more frontward than camera unit 4.

As shown in FIG. 4, working lamp units 7a and 7b are placed on both sides of camera unit 4, and thereby light can be emitted extensively from both sides of camera unit 4. In addition, working lamp units 7a and 7b are placed to laterally protrude from sidewalls 2a of rear vehicle body 2, and thereby a spacing between working lamp units 7a and 7b can also be widened, which may also contribute to extensive emission of light.

Light sources 8a and 8b are placed within working lamp units 7a and 7b, respectively. In the example in FIG. 4, light sources 8a and 8b are placed at a recessed position inside working lamp units 7a and 7b. Therefore, inner surfaces of working lamp units 7a and 7b can be used as reflective surfaces, so that light can be emitted more extensively. Consequently, as shown in FIG. 4, wide illuminated areas 9a and 9b can be realized.

In addition, as shown in FIG. 4, working lamp units 7a and 7b are arranged at the position displaced frontward from the rear side end of rear vehicle body 2, and thereby the sidewalls of rear vehicle body 2 can also be used as reflective surfaces. At this time, by configuring the sidewalls of rear vehicle body 2 used as the reflective surfaces to have a high-lightness color such as yellow, orange and white, the sidewalls can efficiently reflect light from the light sources.

Figure 5:
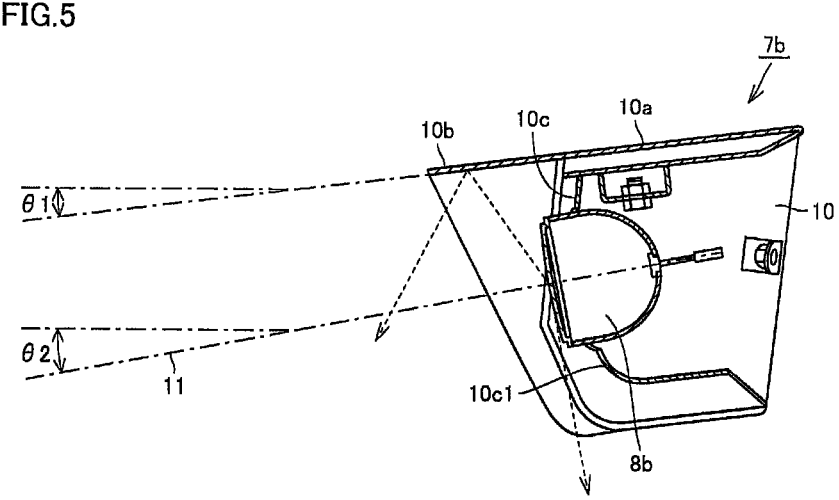
FIG. 5 is a partially enlarged cross-sectional view showing one example of the working lamp unit.

Next, a structural example of working lamp unit 7b will be described with reference to FIGS. 5 and 6. As shown in FIG. 5, working lamp unit 7b includes light source 8b, and a mounting bracket 10 that houses this light source 8b.

A halogen lamp can, for example, be used as light source 8b. Light source 8b has a lens surface 8a1 directed to the light emission direction, and is fixed to mounting bracket 10 by a fixing member.

Figure 6:
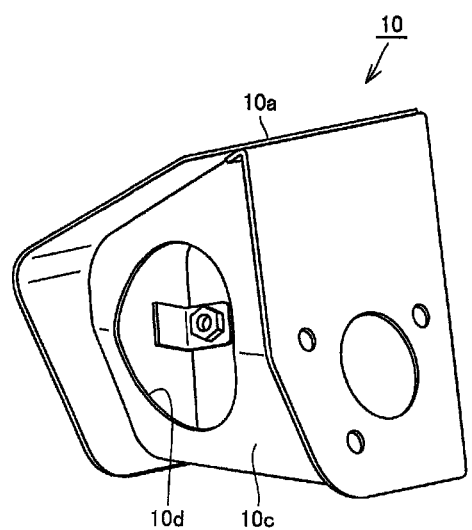
FIG. 6 is an enlarged perspective view showing one example of a bracket for the working lamp unit shown in FIG. 5.

As shown in FIG. 6, mounting bracket 10 mainly includes a protective cover portion 10a made of, for example, a metal and a front surface portion 10c made of a metal and having an opening 10d. Protective cover portion 10a has a function of protecting light source 8b and is provided to surround an upper surface and a side surface of light source 8b. In order to ensure the strength of protective cover portion 10a, protective cover portion 10a is preferably fabricated from a metallic plate member that has been subjected to bending work.

Protective cover portion 10a also includes a pair of sidewall portions arranged on both sides of light source 8b. At least one of the sidewall portions protrudes more in the light emission direction from front surface portion 10c. These sidewall portions can protect light source 8b and inner surfaces of the sidewall portions can also be used as reflective surfaces. At this time, the inner surfaces of the sidewall portions used as the reflective surfaces may be mirror surfaces. When a coating is applied, it is preferable to apply a coating of a high-lightness color such as white and yellow.

In the example in FIG. 6, mounting bracket 10 is fixed to rear vehicle body 2 by one sidewall portion of protective cover portion 10a. It is preferable to cause the sidewall portion that is not fixed to protrude more in the light emission direction than the sidewall portion that is fixed. Similarly, it is preferable to cause an upper surface portion of protective cover portion 10a located above light source 8b to protrude more in the light emission direction than the sidewall portion that is fixed to rear vehicle body 2. As a result, a lower surface of this upper surface portion can be used as a reflective surface. Front surface portion 10c is made of a metallic plate-like member having a surface directed to the light emission direction, and receives light source 8b in opening 10d.

As shown in FIG. 5, a canopy portion (downward illuminating portion) 10b protruding more in the light illumination direction than lens surface 8a1 of light source 8b is provided at a tip of the upper surface portion of protective cover portion 10a. This canopy portion 10b can also be fabricated from a metallic plate member. It is preferable to apply a coating of a high-lightness color such as white and yellow to a lower surface of this canopy portion 10b. As a result, as shown in FIG. 5, the lower surface of canopy portion 10b can be used as a reflective surface.

As shown by a dotted arrow in FIG. 5, light emitted from light source 8b is reflected on the lower surface of canopy portion 10b and is directed downward. As a result, an area around a lower part of wheel loader 1 can be illuminated with the light from light source 8b. On the other hand, direct light from light source 8b is emitted along an optical axis 11 toward a distant area and can illuminate the distant area as well. Consequently, visibility can be ensured both in the distant area and in the area near wheel loader 1.

As shown in FIG. 5, light source 8b is preferably arranged such that at least a part of lens surface 8a1 of light source 8b protrudes in the light illumination direction from front surface portion 10c. As a result, light from light source 8b can be emitted extensively. In addition, by reflecting the extensively emitted light on the reflective surfaces, the light can be emitted more extensively.

In the example in FIG. 5, optical axis 11 of light source 8b is inclined downward by an angle θ2 (e.g., approximately 5° to 15°) with respect to the horizontal direction. This also allows light from light source 8b to be directed downward. In addition, by causing at least a part of lens surface 8a1 of light source 8b to protrude in the light illumination direction from front surface portion 10c and inclining optical axis 11 of light source 8b downward, more light can be emitted downward. Furthermore, as shown in FIG. 5, by inclining canopy portion 10b downward by an angle θ1 with respect to the horizontal direction, more light can be emitted downward.

In the example in FIG. 5, inclination angle θ2 of optical axis 11 of light source 8b with respect to the horizontal direction is larger than inclination angle θ1 of canopy portion 10b with respect to the horizontal direction. As a result, more direct light from light source 8b can be emitted downward. On the other hand, it is also conceivable to set inclination angle θ2 of optical axis 11 of light source 8b with respect to the horizontal direction to be smaller than inclination angle θ1 of canopy portion 10b with respect to the horizontal direction. In this case, an amount of light reflected from canopy portion 10b can be increased and more reflected light can be emitted downward.

As shown in FIG. 5, a portion of front surface portion 10c of mounting bracket 10 located below lens surface 8a1 of light source 8b is preferably provided with an inclined portion 10c1 that is inclined with respect to the vertical direction toward the direction retracted with respect to the light illumination direction (toward the left side in the figure). As a result, as shown by the dotted arrow in FIG. 5, direct light from light source 8b can be directed downward and the area around the lower part of wheel loader 1 can be illuminated with the direct light from light source 8b.

As shown in FIG. 5, a gap is provided between light source 8b and front surface portion 10c. As a result, interference between light source 8b and front surface portion 10c can be avoided.

Although the working lamp unit for illuminating the rear part of the wheel loader has been described by way of example in the aforementioned embodiment, the present invention is applicable to various construction machines other than the wheel loader. Specifically, the present invention is applicable to various construction machines such as, for example, a bulldozer, a scraper, a hydraulic excavator, a shovel loader, a mobile crane, and a motor grader. In addition, the aforementioned working lamp unit may be attached to the front side of the construction machine main body. In this case, similarly to the aforementioned embodiment, the working lamp unit may be arranged at a position displaced rearward from a front side end of the construction machine main body.

A position where the working lamp unit is attached can, however, be selected arbitrarily.

Figure 7:
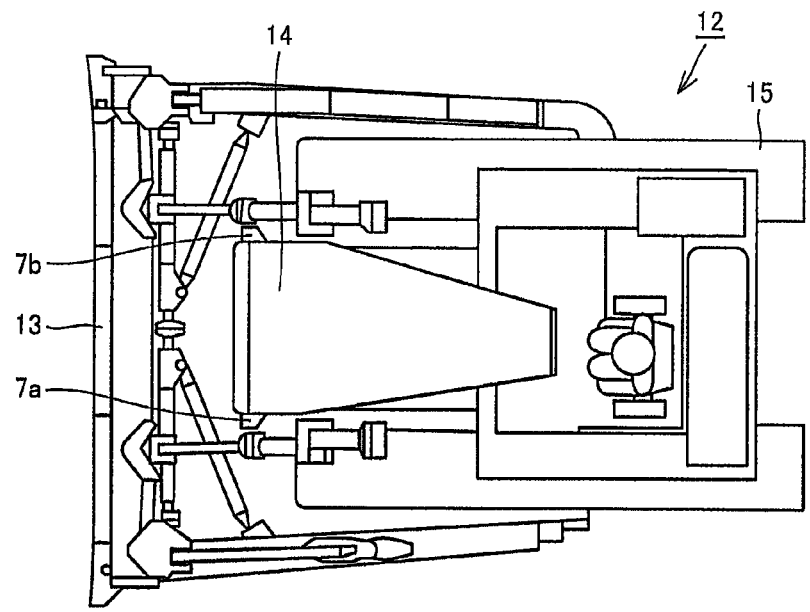
FIG. 7 is a plan view of a bulldozer according to another embodiment of the present invention.

FIG. 7 shows a bulldozer 12 to which the present invention is applied. As shown in FIG. 7, bulldozer 12 includes a blade 13, an engine hood 14 and a crawler belt 15. Working lamp units 7a and 7b are attached on sidewalls of engine hood 14 near a front end. The structure and the like of working lamp units 7a and 7b are similar to those in the aforementioned embodiment.

Figure 8:
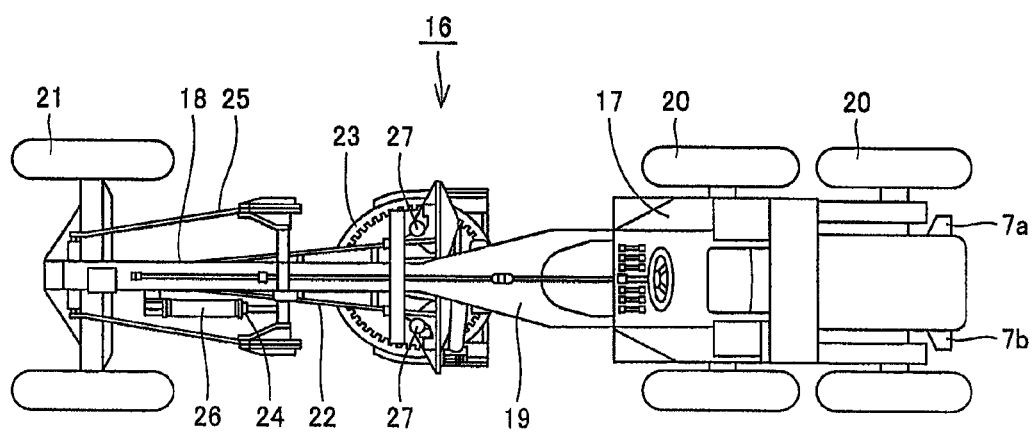
FIG. 8 is a plan view of a motor grader according to still another embodiment of the present invention.

FIG. 8 shows a motor grader 16 to which the present invention is applied. As shown in FIG. 7, motor grader 16 includes a vehicle body 19 including a rear frame 17 and a front frame 18. Rear wheels 20 are attached to rear frame 17 and front wheels 21 are attached to front frame 18. A drawbar 22 is mounted to front frame 18 so as to freely swing up and down by an up-and-down cylinder 27. A blade functioning as an operating device is attached to a slewing circle 23 of drawbar 22, and an arm 25 of a scarifier 24 is mounted to front frame 18 so as to freely swing up and down by a cylinder 26. Working lamp units 7a and 7b are attached on sidewalls of rear frame 17 near a rear end. The structure and the like of working lamp units 7a and 7b are similar to those in the aforementioned embodiment. In all embodiments, the distant area and the area around the lower part of the operating machine can be both illuminated with light from working lamp units 7a and 7b, and visibility can be ensured both in the distant area and in the area near the construction machine.

Although the embodiments of the present invention have been described above, it should be understood that the embodiments disclosed herein are illustrative and not limitative in any respect. The scope of the present invention is defined by the terms of the claims, and is intended to include any modifications within the scope and meaning equivalent to the terms of the claims.

REFERENCE SIGNS LIST 1 wheel loader; 2 rear vehicle body; 2a sidewall; 3a front wheel; 3b rear wheel; 4 camera unit; 5 front frame; 6 operating room; 7a, 7b working lamp unit; 8a, 8b light source; 8a1 lens surface; 9a, 9b illuminated area; 10 mounting bracket; 10a protective cover portion; 10b canopy portion; 10c front surface portion; 10c1 inclined portion; 10d opening; 11 optical axis; 12 bulldozer; 13 blade; 14 engine hood; 15 crawler belt; 16 motor grader; 17 rear frame; 18 front frame; 19 vehicle body; 20 rear wheel; 21 front wheel; 22 drawbar; 23 slewing circle; 24 scarifier; 25 arm; 26 cylinder; 27 up-and-down cylinder; 30 operating device; 31 boom; 32 bucket; 33 boom cylinder; 34 tilt arm; 35 bucket cylinder; 36 tilt rod; 51 center pin; 52 steering cylinder

The invention claimed is:

1. A construction machine, comprising:
a construction machine main body;
an operating mechanism provided at said construction machine main body; and
a working lamp unit attached to a sidewall of said construction machine main body,
said working lamp unit having a light source and a bracket including a downward illuminating portion that covers at least an upper part of said light source and that protrudes more in light illumination direction than a lens surface of said light source and that is inclined downward with respect to a horizontal direction,
a portion of said bracket front surface portion located below said lens surface of said light source being provided with an inclined portion that is inclined with respect to a vertical direction toward a direction retracted with respect to said light illumination direction.

2. The construction machine according to claim 1, wherein said bracket has said front surface portion surrounding said light source, and said light source is arranged such that at least a part of said lens surface of said light source protrudes in said light illumination direction from said front surface portion, and an optical axis of said light source is directed downward with respect to said horizontal direction.

3. The construction machine according to claim 2, wherein an inclination angle of said optical axis of said light source with respect to said horizontal direction is set to be 5° to 15°.

4. The construction machine according to claim 1, wherein said working lamp unit is arranged at a position displaced rearward from a front side end of said construction machine main body or at a position displaced frontward from a rear side end of said construction machine main body.

5. The construction machine according to claim 1, wherein the inclination angle of said optical axis of said light source with respect to said horizontal direction is set to be larger than an inclination angle of said downward illuminating portion with respect to said horizontal direction.

6. The construction machine according to claim 1, wherein said bracket includes, around said front surface portion, at least one sidewall portion protruding more in said light illumination direction than said front surface portion.

* * * * *